Patented May 28, 1929.

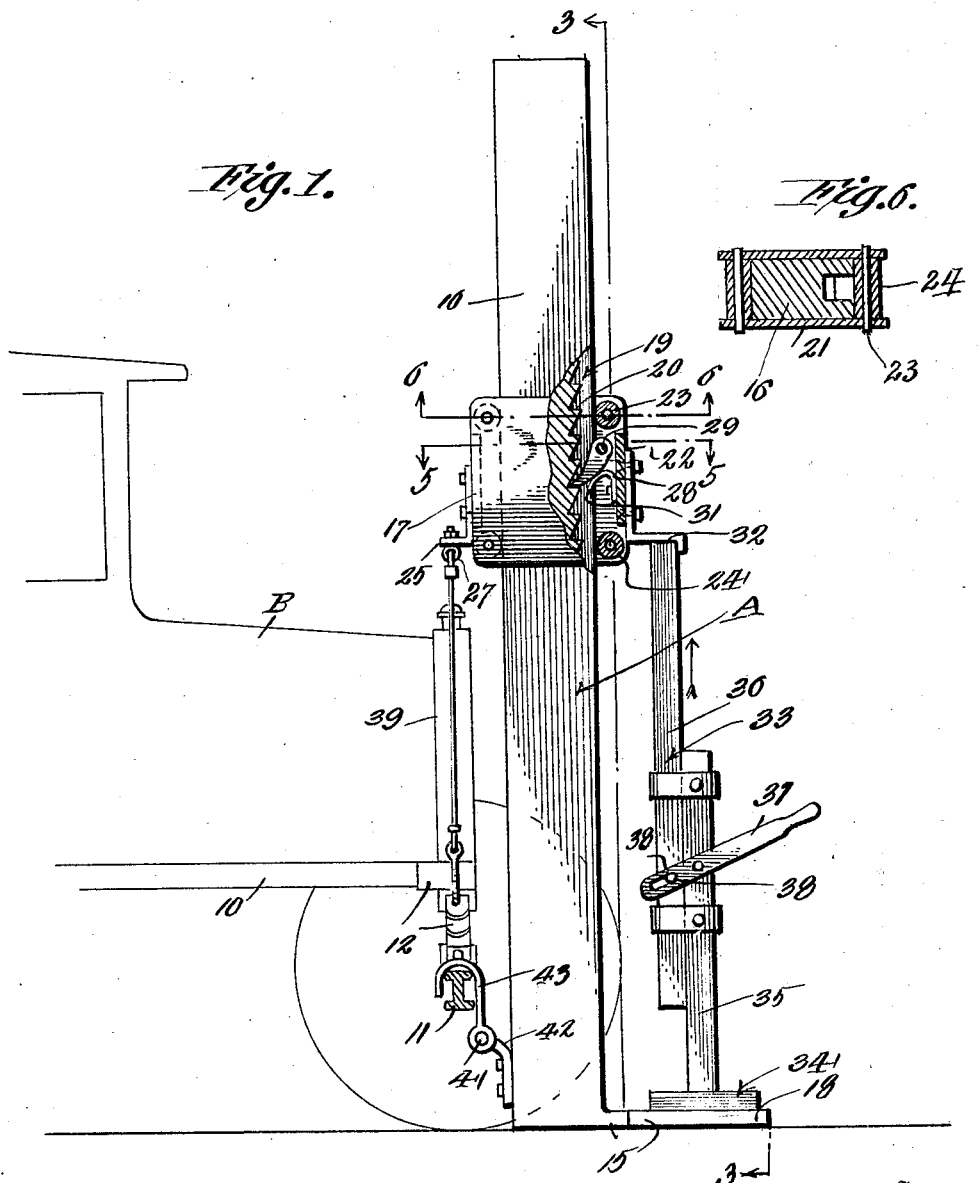

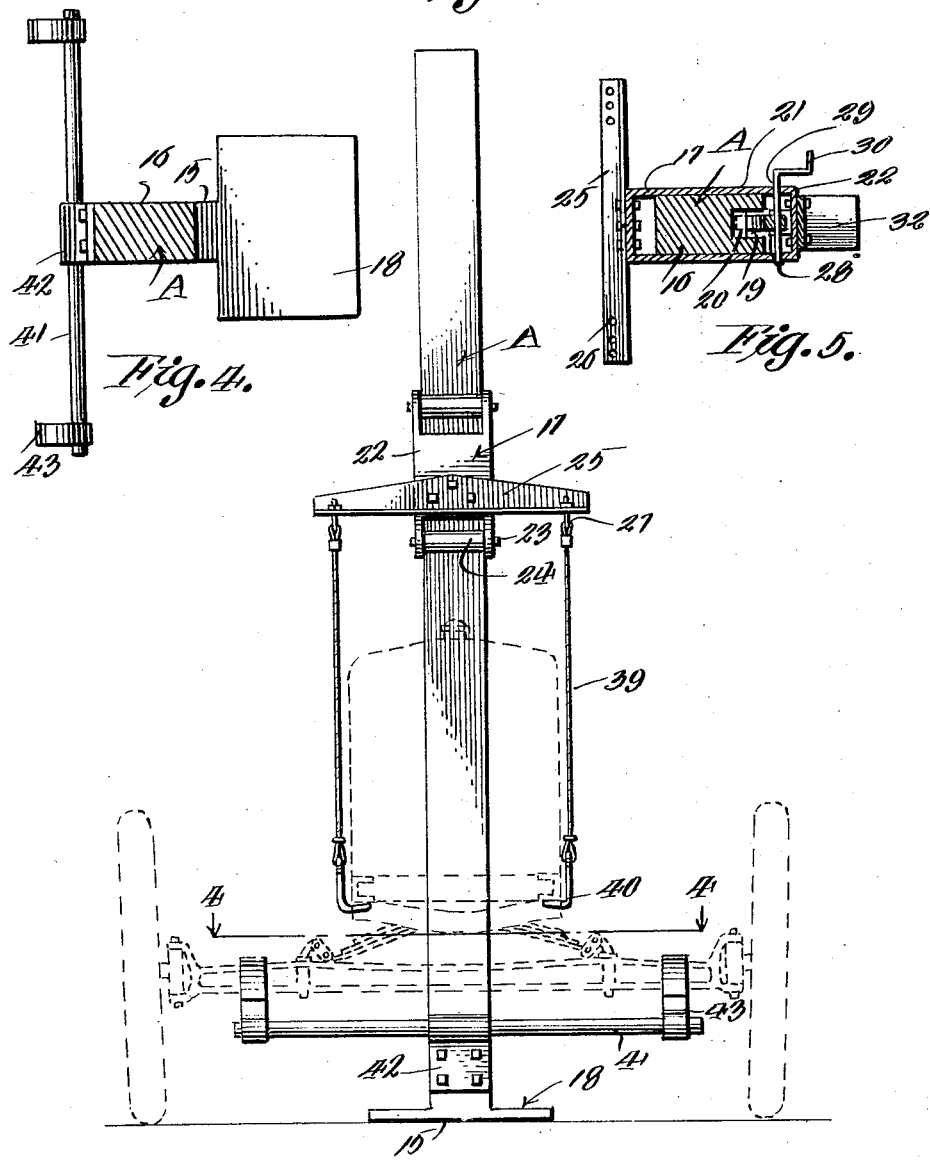

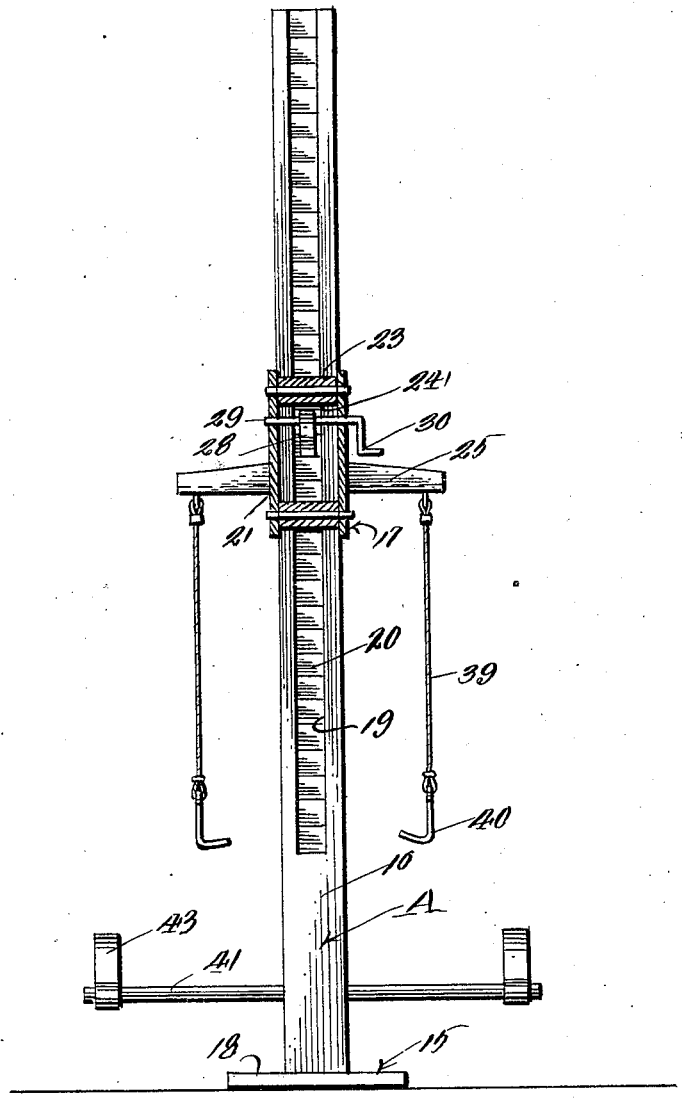

1,714,554

UNITED STATES PATENT OFFICE.

ANDREW W. FITZ, OF COUNCIL BLUFFS, IOWA.

AUTOMOBILE LIFTER.

Application filed February 17, 1927. Serial No. 169,073.

This invention appertains to hoisting appliances and more particularly to a novel device for use in conjunction with automobiles.

An important object of the present invention is to provide novel means for facilitating the removal of vehicle springs, such as the front springs of Ford cars.

Another object of the invention is the provision of an improved device for removing springs from vehicles embodying means for engaging the vehicle body to lift the same relative to the vehicle axle and novel means for anchoring the axle against movement during the raising of the body, whereby the springs can be conveniently and expeditiously unfastened and removed from the body and axle.

A further object of the invention is the provision of a supporting standard of relatively heavy construction having reciprocally mounted thereon a lifting carriage with means for raising and lowering the carriage on the standard, the carriage and standard carrying respectively means for engaging the vehicle body and axle.

A further object of the invention is the provision of novel means for locking the carriage on the standard and novel means connected with the carriage for detachably engaging the body of a vehicle.

A further object of the invention is the provision of novel means carried by the standards for detachably engaging the vehicle axle, the means being so arranged as to permit the same to be readily swung into and out of engagement with the axle.

A still further object of the invention is the provision of a novel vehicle spring remover of the above character, which will be durable and efficient in use, one that will be simple and easy to manufacture, and one which can be placed upon the market at a reasonable cost.

With these and other objects in view, the invention consists in the novel construction arrangement and formation of parts as will be hereinafter more specifically described, claimed, and illustrated in the accompanying drawings, in which drawings:

Figure 1 is a side elevation of the improved spring removing device showing the same in use, parts of the device being broken away and in section, Figure 2 is a rear elevation of the improved device showing the same in use, Figure 3 is a vertical section through the device taken on the line 3—3 of Figure 1 looking in the direction of the arrows, Figure 4 is a horizontal section through the standards of the device showing the axle engaging means in plan, Figure 5 is a horizontal section taken on the line 5—5 of Figure 1 looking in the direction of the arrows illustrating the locking device for the carriage.

Figure 6 is a detail horizontal section taken on the line 6—6 of Figure 1 looking in the direction of the arrows showing the antifriction rollers associated with the carriage.

Referring to the drawings in detail, wherein similar reference characters designate corresponding parts throughout the several views the letter A generally indicates the improved vehicle spring lifter and B an automobile with which the same can be used.

The vehicle B has simply been shown to illustrate the use of the improved device A and as shown includes the chassis 10, the front dead axle 11 and the transversely extending front spring 12 connecting the chassis 10 with the dead axle 11.

The improved device A comprises a base plate 15, which is preferably formed of a sufficient size to provide a firm support for engaging the ground. The base plate 15 has formed on one end thereof or connected therewith an upright standard or post 16 on which is reciprocally mounted a lifting carriage 17. The base plate 15 projects laterally from the standard or post 16 and forms a foot 18 for a purpose which will be later described.

In the present instance the post or standard 16 is of a polygonal shape in cross section and the front face thereof is provided with a longitudinally extending groove 19 which forms a guideway as will be later described. The inner face of the grove 19 has formed thereon or connected therewith a rack bar 20.

The carriage 17, as stated, is slidably mounted upon the standard or post and is of any preferred construction, but as shown the same includes a pair of side plates 21 which engage the opposite faces of the post. These side plates are preferably joined by end plates 22 which terminate short of the upper and lower ends of the carriage. Roller shafts 23 are connected with the side plates 21 and are disposed above and below the end plates 22 and receive the anti-friction rollers 24 which engage the front and rear faces of the post. This allows the easy sliding of the carriage on the post without binding.

The rear end plate 22 has bolted or otherwise connected thereto a transversely extending angle iron 25 and this angle iron forms a lifting head for the body 10 of the vehicle as will later appear. It is to be noted at the present time that the terminals of the angle iron are provided with a plurality of openings 26 into any one of which eyes 27 are adapted to fit.

In order to lock the carriage 17 on the post or standard 16 I provide a dog 28 which is secured to a transversely extending shaft 29 supported by the carriage. This shaft is preferably rockably mounted in the side plates 21 and one end of the shaft is provided with a hand crank 30 whereby the same can be moved into or out of engagement with the rack bar 19. I prefer to provide a spring 31 for normally urging the dog into engagement with the rack bar, whereby the carriage will be automatically locked against lowering movement on the post at all times.

The front end plate 22 has bolted or otherwise secured thereto a laterally projecting arm 32 which overlies the foot 18.

In order to raise the carriage a jack of any preferred type is placed on the foot 18 with its head in engagement with the arm 32 and it is obvious that by operating the shaft the carriage would be slid upwardly on the post. In the present instance I have shown a jack 33 which simply includes a base 34, a standard 35 and a sliding lift leg 36. The leg 36 can be raised or lowered in any preferred way on the standard 35 and in the present instance a lever 37 is pivoted to the standard at a point intermediate its ends and is connected to the leg 36 by a slot and pin connection 38. By moving the lever down the leg 36 can be raised.

In order to connect the carriage 17 with the body 10 of the vehicle cables 39 are connected to the eyes 27 and the lower ends of the cables carry hooks 40 for engaging the channel beams of the chassis or body. By fitting the eyes 27 in different openings 26 the position of the hooks 40 can be adjusted relative to one another for different widths of automobiles.

To prevent the axle 11 from being pulled up with the carriage 17 a transverse shaft 41 is carried by a bracket 42 which is bolted or otherwise secured to the standard or post 16 adjacent to the lower end thereof. Rockably mounted upon the shaft 41 are hooks 43 which are adapted to be swung over the axle 11. These hooks can be adjusted on the axle for different widths of cars and if preferred the bracket 42 can be adjustably connected with the post so that the hooks can be raised and lowered to permit the engagement thereof with axles which are disposed different distances from the ground.

In operation of the improved device the carriage 17 is initially raised to a convenient height on the standard 16 so that the hooks 40 can be placed under the channel beams of the chassis after which the hooks 43 are swung over the axle 11. The jack 33 is now placed on the foot 18 with the lifting leg 36 in engagement with the arm 32 and the lever 37 is actuated a slight distance so as to relieve tension on the spring 12. The fastenings for the spring are now removed and the lever 37 is further actuated so as to raise the body. The spring 12 can now be conveniently removed from the car. The desired repairs can now be expeditiously made to the spring and the same can be readily reattached to the body and axle. It is obvious that the improved device can be used for a number of purposes other than removing the springs from the cars.

Changes in details may be made without departing from the spirit or scope of this invention, but:

What I claim as new is:

1. A device of the character described comprising a standard, a carriage slidably mounted upon the standard, depending hooks connected with the carriage for engaging the body of an automobile, a transverse shaft carried by the standard adjacent to the lower end thereof, hooks rockably mounted on the shaft for detachable connection with a vehicle axle, means for raising the carriage on the standard, and means for releasably locking the carriage on the standard in an adjusted position.

2. A device of the character described comprising a base plate including a foot, a standard connected with one end of the foot, a carriage reciprocally mounted upon the standard having a lateral arm overlying the foot, a jack disposed between the foot and arm, and means carried by the carriage and standard for engaging a vehicle chassis and axle respectively.

3. A device of the character described comprising a standard, a carriage slidably mounted upon the standard having anti-friction rollers, means for raising and lowering the carriage on the standard, means for releasably locking the carriage on the standard, a transversely extending bar connected with the carriage, and depending hooks carried by the bar and adjustable thereon.

In testimony whereof I affix my signature.

ANDREW W. FITZ.